United States Patent
Dycus

(10) Patent No.: US 8,373,572 B2
(45) Date of Patent: Feb. 12, 2013

(54) BATTERY ASSEMBLY WITH ALARM

(75) Inventor: Sean T. Dycus, Zurich (CH)

(73) Assignee: Covidien LP, Mansfield, MA (US)

( * ) Notice: Subject to any disclaimer, the term of this patent is extended or adjusted under 35 U.S.C. 154(b) by 0 days.

(21) Appl. No.: 13/453,174

(22) Filed: Apr. 23, 2012

(65) Prior Publication Data

US 2012/0200420 A1    Aug. 9, 2012

Related U.S. Application Data

(63) Continuation of application No. 12/569,292, filed on Sep. 29, 2009, now Pat. No. 8,179,276.

(51) Int. Cl.
*G08B 21/00*    (2006.01)

(52) U.S. Cl. .......... 340/679; 340/628; 340/636.13; 340/542; 340/652; 340/10.1; 320/106; 320/107; 320/118; 320/119; 320/165

(58) Field of Classification Search ............. 340/679, 340/426.28, 542, 636.13, 636.19; 320/134, 320/136, 163, 165
See application file for complete search history.

(56) References Cited

U.S. PATENT DOCUMENTS

| | | | |
|---|---|---|---|
| 4,602,203 A | 7/1986 | Bragdon | |
| 4,881,063 A | 11/1989 | Fawcett | |
| 4,916,438 A | 4/1990 | Collins et al. | |
| 5,191,855 A | 3/1993 | Conforti | |
| 5,239,286 A | 8/1993 | Komatsuda | |
| 5,646,598 A | 7/1997 | Nickles et al. | |
| 5,868,794 A | 2/1999 | Barkley et al. | |
| 6,018,227 A | 1/2000 | Kumar et al. | |
| 6,340,876 B1 * | 1/2002 | Saint-Pierre | 320/106 |
| 6,504,344 B1 | 1/2003 | Adams et al. | |
| 6,853,301 B2 | 2/2005 | Devine | |
| 7,148,808 B1 | 12/2006 | Pfahlert et al. | |
| 7,493,813 B2 | 2/2009 | Nunes et al. | |
| 8,030,898 B2 | 10/2011 | Okuto | |
| 2005/0253832 A1 * | 11/2005 | Chung | 345/204 |
| 2007/0018818 A1 * | 1/2007 | Andres et al. | 340/571 |
| 2007/0090788 A1 | 4/2007 | Hansford et al. | |
| 2008/0143499 A1 * | 6/2008 | Shimomura | 340/426.28 |
| 2008/0272739 A1 | 11/2008 | Carrier et al. | |
| 2008/0304199 A1 | 12/2008 | Cruise et al. | |

FOREIGN PATENT DOCUMENTS

| | | |
|---|---|---|
| GB | 2215895 | 9/1989 |
| JP | 2005342796 | 12/2005 |
| WO | 2005/095167 A1 | 10/2005 |
| WO | 2006/024029 A2 | 3/2006 |
| WO | 2006/044750 A2 | 4/2006 |

OTHER PUBLICATIONS

International Search Report EP10181970 dated Dec. 28, 2010.

* cited by examiner

*Primary Examiner* — Tai T Nguyen

(57) ABSTRACT

A battery alarm for use with a battery assembly is provided, the battery alarm including a first activation component, a signaling component, and an output component. The first activation component is configured to activate the alarm upon disengagement of the battery assembly from a battery-operated device and is further configured to deactivate the alarm upon engagement of the battery pack with the battery-operated device. The signaling component is coupled to the first activation component and is configured to transmit a signal when the alarm is activated. The output component is adapted to receive the signal from the signaling component and is configured to produce a visual, audible, and/or tactile output upon receipt of the signal from the signaling component.

18 Claims, 3 Drawing Sheets

BATTERY ASSEMBLY WITH ALARM

CROSS-REFERENCE TO RELATED APPLICATIONS

The present application is a continuation application of U.S. patent application Ser. No. 12/569,292 filed on Sep. 29, 2009 now U.S. Pat. No. 8,179,276, the entire contents of which is incorporated by reference herein.

BACKGROUND

The present disclosure relates to an alarm for a battery pack and, more particularly, to a battery alarm for surgical instruments to reduce the change of battery deflagration.

TECHNICAL FIELD

Rechargeable batteries, such as lithium-ion batteries, are commonly used in a wide range of portable electronic devices including cell phones, laptop computers, surgical instruments, and handheld tools. Lithium-ion batteries, in particular, are advantageous in that they are relatively light and have a relatively large capacity as compared to nickel-cadmium or lead-acid batteries. However, a concern when using battery types such as lithium-ion batteries is overheating, which may result in thermal runaway and/or deflagration.

Thermal runaway refers to a positive-feedback process in which the reaction rate of a chemical reaction is increased due to an increase in temperature. The increased reaction rate, in turn, causes a further temperature increase, thereby allowing the cycle to continue, or "runaway." Thermal runaway in batteries may ultimately result in deflagration of the battery cells. Deflagration is a combustion reaction that propagates at a rapid rate driven by the transfer of heat. Put more generally, deflagration, a potential result of thermal runaway, is an intense fire or explosion.

In the surgical arena, for example, surgical instruments and tools are commonly placed in an autoclave as part of the sterilization process. Autoclaves are pressurized environments that sterilize equipment by raising the temperature inside the vessel to at least 121° C. (250° F.) at a pressure of at least 15 psi. If a battery pack for use with a surgical instrument is exposed to this environment, there is an increased risk of thermal runaway and/or deflagration due to overheating. Thermal runaway and/or deflagration may not only cause damage to the battery pack, it may also damage the other devices within the autoclave and may damage the autoclave itself.

Similarly, with respect to handheld tools and portable electronic devices, thermal runaway and/or deflagration may occur where the battery pack is placed in a non-qualified (non-compatible) charger. Voltage requirement differences between the rechargeable battery pack and the non-qualified charger may cause permanent damage to the battery pack and the charger, leading to overheating. Further, if the battery is subject to high temperature or high humidity conditions, thermal runaway and/or deflagration may occur.

SUMMARY

It is therefore desirable to prevent battery packs from being placed in high-temperature environments, high-humidity environments, or other improper locations. Accordingly, a battery alarm may be used to alert or warn a user as to the position, location, or condition of the battery. This warning would help remind the user not to place the battery pack in places where it may be subject to damaging conditions. Thus, the warning may help to reduce the risk of thermal runaway and/or deflagration.

The present disclosure relates to a battery alarm for use with a battery assembly, the battery alarm including a first activation component, a signaling component and an output component. The first activation component is configured to activate the alarm upon disengagement of the battery assembly from a battery-operated device and is further configured to deactivate the alarm upon engagement of the battery assembly with the battery-operated device. The signaling component is coupled to the first activation component and is configured to transmit a signal when the alarm is activated. The output component is adapted to receive the signal from the signaling component and is configured to produce at least one of a visual, audible, and tactile output upon receipt of the signal from the signaling component.

In one embodiment, the signaling component is a countdown timer circuit configured to begin countdown upon activation of the alarm. Upon passage of a preselected length of time (i.e., when the countdown expires), the signaling component sends the signal to the output component. The preselected length of time may be in the range of 15 seconds to 5 minutes.

In another embodiment, the signaling component is an inductance-sensing circuit that signals the output component upon contact between the signaling component and a magnetically conductive material. At least one signaling pad may be disposed on a surface of the battery assembly and may further be electrically coupled to the signaling component such that the signal is sent to the output component upon contact between any one of the signaling pads and a magnetically conductive surface.

In yet another embodiment, the battery alarm further includes a second activation component. The second activation component is configured to activate the alarm upon disengagement of the battery assembly from a qualified battery charger and is further configured to deactivate the alarm upon engagement of the battery assembly with the qualified battery charger.

In yet another embodiment, the first and second activation components constitute a single activation component.

In still yet another embodiment, the first activation component is mechanically activated. Alternatively, the first activation component may include an electrical circuit.

A battery assembly including a battery alarm is also provided in accordance with one embodiment of the present disclosure. The battery assembly includes at least one rechargeable battery cell for use with a battery-operated device and a battery alarm. The battery alarm includes an activation component, a signaling component and an output component. The activation component is configured to activate the battery alarm upon disengagement of the battery assembly from the battery-operated device and/or a battery charger and is further configured to deactivate the alarm upon engagement of the battery assembly with the battery-operated device and/or the battery charger. The signaling component is coupled to the activation component and is configured to transmit a signal when the alarm is activated. The output component is adapted to receive the signal from the signaling component and is further configured to produce a visual, audible, and/or tactile output upon receipt of the signal from the signaling component.

In another embodiment, the signaling component is a countdown timer circuit configured to begin countdown upon activation of the battery alarm and wherein, upon passage of a preselected length of time, the signaling component sends the signal to the output component.

In another embodiment, the signaling component is an inductance-sensing circuit that signals the output component upon contact between the signaling component and a magnetically conductive material. The battery assembly including the battery alarm may also include one or more signaling pads disposed on a surface of the battery assembly and electrically coupled to the signaling component such that the signal is sent to the output component upon contact between the signaling pads and a magnetically conductive surface.

In another embodiment, the activation component may be mechanically activated and/or may include an electrical circuit.

BRIEF DESCRIPTION OF THE DRAWINGS

Various embodiments of the presently disclosed battery alarm are described herein with reference to the drawings, wherein.

DETAILED DESCRIPTION

Embodiments of the presently disclosed battery alarm are described hereinbelow with reference to FIGS. 1-5. Reference to surgical instruments shown and described below are meant to be examples as it is contemplated that the presently disclosed battery alarm may be used in accordance with any replaceable battery pack including, but not limited to, those used in surgical instruments, handheld tools, and portable electronic devices.

Figure 1:
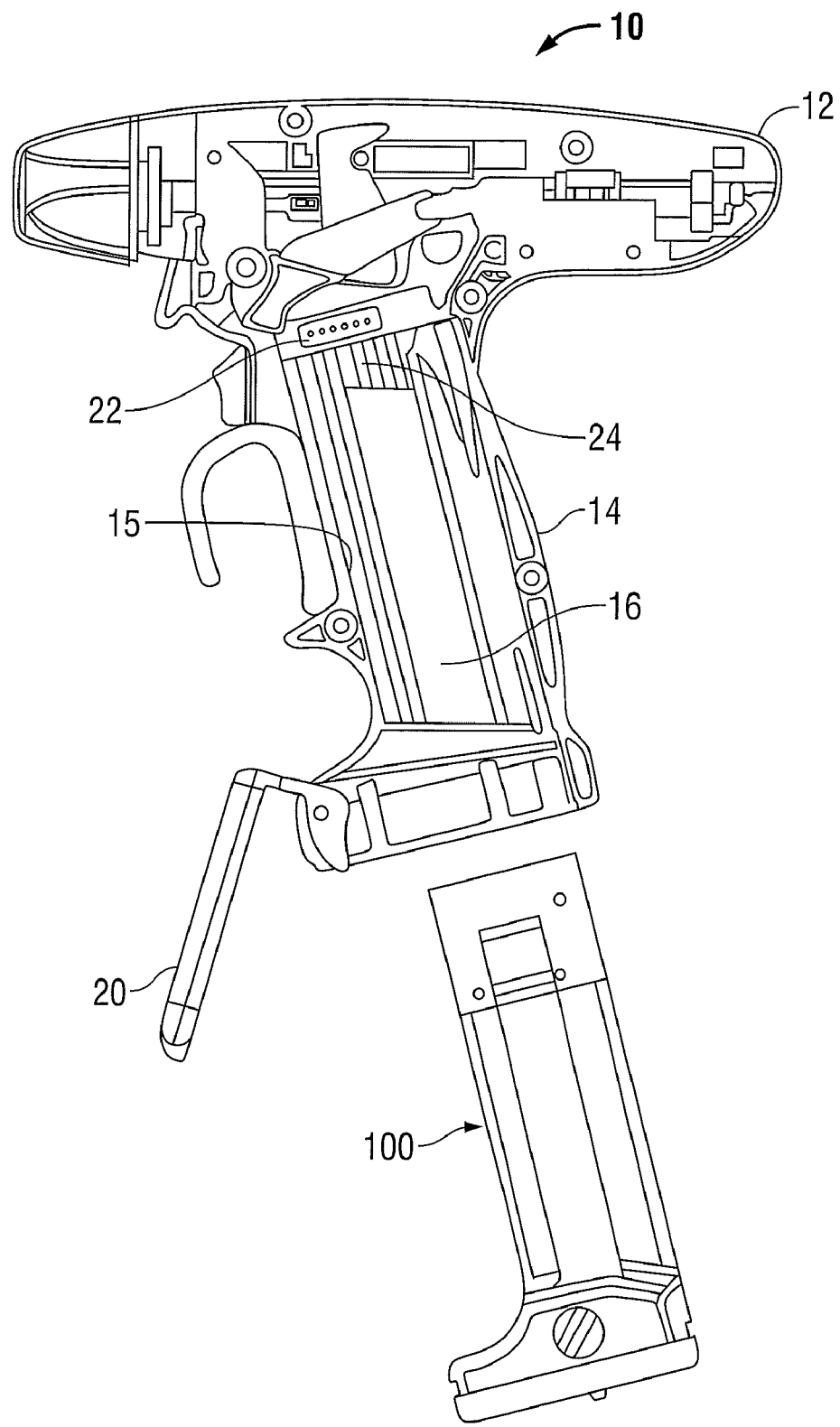
FIG. 1 is a side-cross-sectional view of a surgical instrument configured for reception of a battery assembly therein.

Turning now to FIG. 1, a surgical instrument 10 is shown including a housing portion 12 having a handle 14. A chamber 16 is defined within handle 14 for receiving a battery assembly 100. Battery door 20 is pivotally connected to handle 14 and is configured to pivot from an open position (as shown in FIG. 1) to a closed position (not shown) to fixedly retain battery assembly 100 within handle 14. Disposed inside handle chamber 16 is distribution panel 22 including a set of conductors 24 configured to electrically connect with individual supply ports 118 of a supply array 110 of the battery assembly 100 (see FIG. 2). Coupling the battery assembly 100 in this position provides power to the surgical instrument 10.

Figure 2:
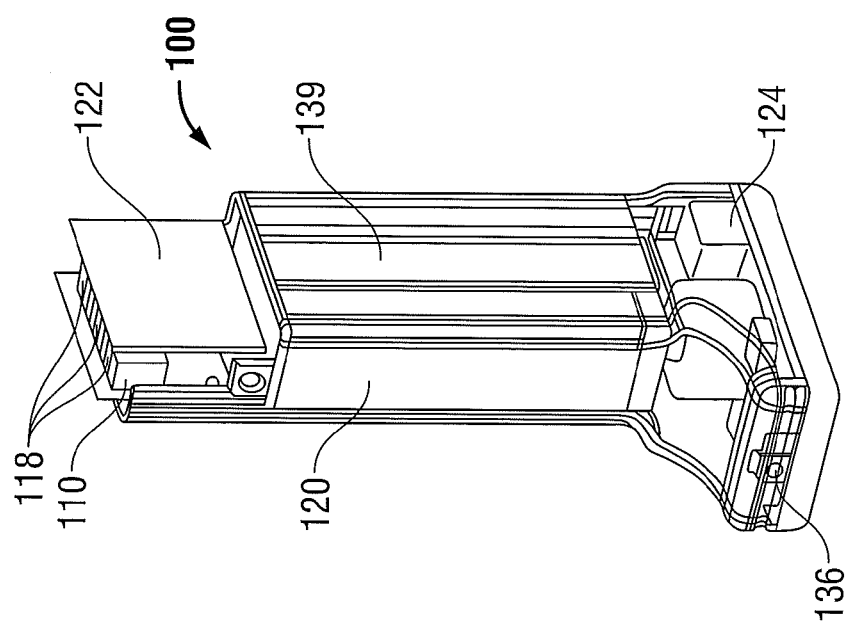
FIG. 2 is an enlarged, perspective side view of the battery assembly of FIG. 1, including a battery alarm in accordance with an embodiment of the present disclosure.

Referring now to FIG. 2, battery assembly 100 includes at least one power cell 120 (e.g., a plurality of lithium polymer cells) electrically connected to voltage control circuitry 122. Voltage control circuitry 122 provides an output signal, which is received by radio-frequency signal-generating circuitry 124. Signal-generating circuitry 124, in turn, converts the output signal into a high-frequency alternating-current (AC) signal, which is then supplied to instrument 10 via supply ports 118 and distribution panel 22 to thereby supply power to instrument 10.

As will be described hereinbelow, a battery alarm 125 is provided in accordance with the present disclosure for use in conjunction with a battery assembly, such as battery assembly 100.

Figure 3:
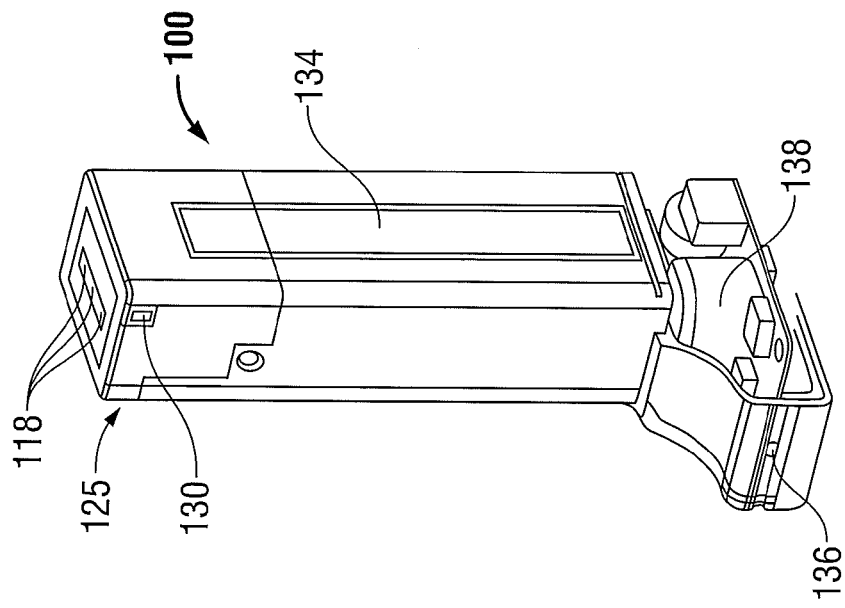
FIG. 3 is a perspective and partly transparent view of the battery assembly of FIG. 1.

As shown in FIG. 3, battery assembly 100 includes an activation component, or tab, 130. Tab 130 protrudes outwardly from battery assembly 100 and is configured to activate and deactivate the battery alarm 125. When tab 130 is protruding outwardly, e.g., when battery assembly 100 is disengaged from instrument 10, battery alarm 125 is activated. Tab 130 may be biased outwardly to retain this outwardly protruding state in an at-rest position. However, once battery assembly 100 is inserted into chamber 16 of handle 14 (FIG. 1), such that conductors 24 connect with individual supply ports 118, tab 130 is biased inwardly by inner surface 15 of chamber 16. When tab 130 is biased inwardly, battery alarm 125 is deactivated. Thus, battery alarm 125 is activated when battery assembly 100 is not engaged with the instrument 10 and is deactivated when the battery assembly 100 is engaged with the instrument 10. It is envisioned that tab 130 may be positioned anywhere on battery assembly 100 so long as tab 130 is mechanically engageable with instrument 10 such that battery alarm 125 is activated when battery assembly 100 is disengaged from instrument 10 and such that battery alarm 125 is deactivated when battery assembly 100 is engaged with instrument 10. Further, it is also envisioned that the activation component may be any mechanically-activated mechanism configured to activate and deactivate battery alarm 125 as discussed above.

Figure 4:
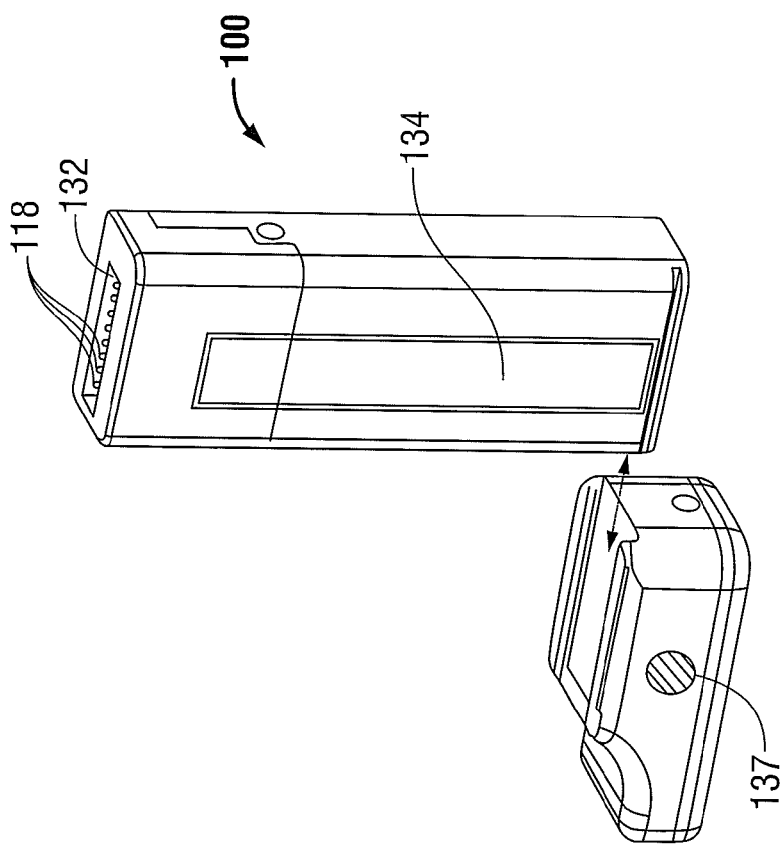
FIG. 4 is an exploded perspective view of the battery assembly of FIG. 3.

Alternatively, instead of tab 130 acting as a mechanical activation component for battery alarm 125, it is envisioned that electrical circuitry 132 (see FIG. 4) may act as an electrical activation component for battery alarm 125. Referring now to FIG. 4, electrical circuitry 132 is electrically coupled to supply ports 118 such that when supply ports 118 of battery assembly 100 are disconnected from conductors 24 of instrument 10, e.g., when battery assembly 100 is disengaged from instrument 10, an electrical circuit is completed, thereby activating battery alarm 125. On the other hand, when supply ports 118 connect to conductors 24, the electrical circuit is broken, thereby deactivating battery alarm 125. Thus, similar to the mechanical activation component 130 discussed above, electrical activation component 132 operates to activate battery alarm 125 when the battery assembly 100 is disengaged from instrument 10 and deactivates battery alarm 125 when the battery assembly 100 is engaged with instrument 10.

Figure 5:
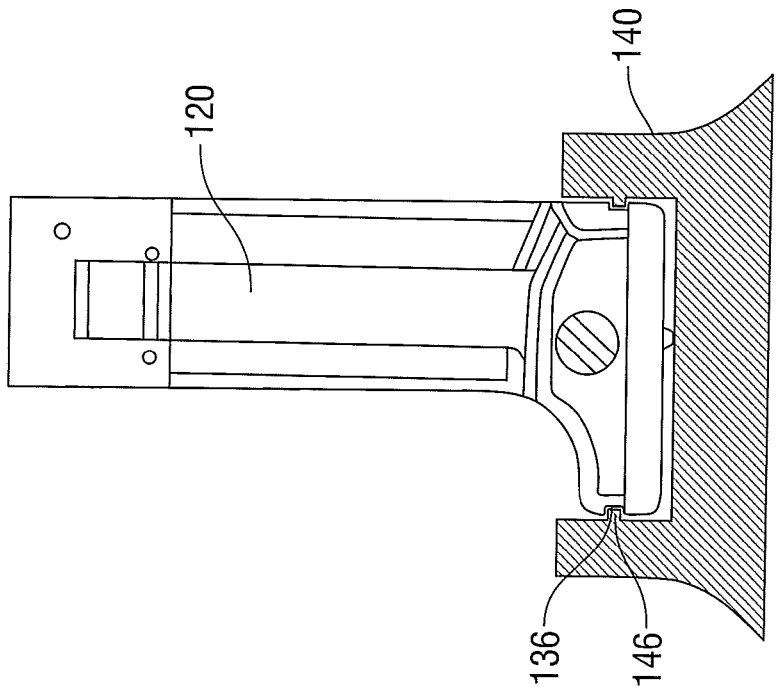
FIG. 5 is a perspective view of the battery assembly inserted into a qualified battery charger.

In addition to the first activation component described in several embodiments above, battery alarm 125 may also be provided with a second activation component 136 (FIG. 5). The second activation component 136, like the first activation component (e.g., tab 130 or circuitry 132), may be any suitable mechanical mechanism or electrical circuit. As shown in FIG. 5, second activation component 136 is a mechanically-activated tab 136. Second activation component 136 operates in a similar manner to the first activation component 130. However, while the first activation component (e.g., tab 130 or circuitry 132) activates and deactivates battery alarm 125 upon disengagement and engagement, respectively, of the battery assembly 100 with the instrument 10, the second activation component 136 is configured to activate and deactivate battery alarm 125 upon disengagement and engagement, respectively, of battery assembly 100 with a qualified, or compatible, battery pack charger 140.

As shown in FIG. 5, when battery assembly 100 is inserted into qualified charger 140, tab 136 is forced inwardly by protrusion 146 on the inner surface of battery charger 140. When tab 136 is forced inwardly, battery alarm 125 is deactivated. Thus, in operation, battery alarm 125 is deactivated when the battery assembly 100 is engaged with the charger 140. Tab 136 may be biased in an outwardly protruding state in an at-rest position, thereby maintaining battery alarm 125 in an activated state when not disposed within charger 140.

The alignment of tab 136 of battery assembly 100 and protrusion 146 of charger 140 are positioned such that, as discussed above, tab 136 is forced inward upon battery assembly 100 being positioned within charger 140. Since it is unlikely that non-compatible chargers will include a similar protrusion 146 which lines up with tab 136 upon insertion therein, battery alarm 125 will remain activated when battery assembly 100 is inserted into a non-compatible charger. Thus, the battery alarm 125 may alert the user when the battery assembly 100 is inserted into an incompatible charger. This helps to ensure that the battery assembly 100 is not inadvertently placed in the charger for a device having a different voltage requirement, which may cause thermal runaway and/or deflagration.

Further, although the first and second activation components, e.g., tab 130 and tab 136 respectively, may be separate components corresponding to the instrument 10 and the charger 140, respectively, it is envisioned that a single activation component e.g., tab 136 may operate as both the first and second activation components. For example, tab 136, discussed above (see FIGS. 3, 5), may operate to bias inward upon insertion of battery assembly 100 into either instrument 10 or charger 140. Accordingly, upon insertion into instrument 10, battery alarm 125 would be deactivated. Likewise, battery alarm 125 will also be deactivated upon insertion into a qualified charger 140. A non-qualified or incompatible charger, on the other hand, may not have the proper shape to bias tab 136 inwardly, and thus battery alarm 125 would remain activated.

The remaining components of battery alarm 125 will now be described, keeping in mind that, in one embodiment, battery alarm 125 is only operational when it has been activated in the manner discussed above. Alternatively, the activation components, e.g., tab 130 or tab 136, discussed above may be omitted, allowing battery alarm 125 to continuously remain in an activated state.

Once the battery alarm is activated, a signaling component is used to signal an output component 137 for triggering alarm 125. In one embodiment, a countdown timer circuit 138 (FIG. 3) is used to signal the output component 137. The countdown timer circuit 138 may be any suitable device that is capable of signaling the output component 137 upon passage of a pre-selected amount of time. For example, the countdown timer circuit 138 may be set for 30 seconds such that once the battery assembly 100 is disengaged from the instrument 10, the countdown timer circuit begins, and, at the expiration of 30 seconds, a signal is sent from the countdown timer circuit 138 to an output component 137, e.g., to alert the user to engage the battery assembly 100 in a charger 140 or insert the battery assembly 100 into the surgical instrument 10.

Thus, the countdown timer circuit 138 (FIG. 3) gives a user a preset amount of time before the battery alarm 125 is triggered. For example, upon completion of a surgical procedure, a user may disengage battery assembly 100 from the instrument 10. Thereafter, the battery assembly 100 may be placed in numerous different locations. Triggering the battery alarm 125 after a preset amount of time alerts the user to the fact that the battery assembly 100 is not disposed within an instrument 10 or a qualified charger 140. This warning helps prevent placement of the battery assembly 100 in a location where it may be subject to high heat and/or humidity. For example, battery alarm 125 may remind a user to keep battery assembly 100 away from an autoclave, so it is not accidentally placed in the autoclave with other surgical instruments. Further, the warning alerts the user to place the battery assembly 100 in a proper charger 140, such that the battery assembly 100 is charged for subsequent use.

Alternatively, an inductance sensing circuit 139 (FIG. 2) may be employed to signal the output component 137. The inductance sensing circuit 139 is configured to sense changes in inductance due to the presence of magnetically conductive material nearby. In one particular embodiment, pads 134 are provided on the outer surface of battery assembly 100 (see FIG. 4). Pads 134 are configured as inductance sensing pads 134, capable of detecting when a magnetically-conductive material is in contact with the pads 134. This embodiment is particularly useful in the surgical field, where it is common practice to place surgical equipment on metal trays or racks, which are then loaded into an autoclave for sterilization. In use, the pads 134 would signal the output component 137 upon pads 134 contacting the magnetically conductive surface of the metal tray, thereby warning the user that the battery assembly 100 may potentially be subject to damaging conditions, such as those inside an autoclave.

The above-described countdown timer circuit 138 and inductance sensing circuit 139 may also be used in conjunction with one another to provide the signaling component of the battery alarm 125. For example, inductance sensing circuit 139 including pads 134 disposed on battery assembly 100 may cooperate with countdown timer circuit 138. Thus, upon contact of pads 134 with a magnetically conductive surface, the inductance sensing circuit 139 initiates the countdown timer circuit 138, beginning the countdown. Upon expiration of the pre-selected countdown time, a signal would be sent to the output component 137. Put more generally, the use of the countdown timer circuit 138 in conjunction with the inductance sensing circuit 139 creates a specific time delay between the detecting of a magnetically conductive surface, e.g., the placing of battery assembly 100 onto a metal tray, and the triggering of the battery alarm 125 (e.g., audible, visual and/or tactile battery alarm).

As discussed above, the battery alarm 125 may be deactivated when the battery assembly 100 is placed in a qualified charger 140 or when the battery assembly 100 is engaged with an instrument 10. Through use of either or both of the signaling components discussed above, a user can be warned when the battery assembly 100 is not engaged within the instrument 10 or a qualified battery charger 140. This reminds the user to ensure proper placement of the battery assembly 100 after use. With battery assembly 100 positioned within charger 140 or otherwise properly placed, the risk of battery assembly 100 being subject to high heat and/or humidity environments, e.g., the environment inside an autoclave, is reduced. Thus, the risk of thermal runaway and/or deflagration is reduced.

The signal produced from the countdown timer circuit 138 upon completion of the countdown, the signal from the inductance sensing circuit 139, or a signal from any other suitable signaling component is transmitted to an output component 137, which produces a visual, audible, tactile, or any combination thereof, "alarm." Any suitable visual, audible, or tactile output component or any combination thereof may be used. Depending on the surrounding environment, one or more of the above-mentioned outputs may be especially desirable. For example, in a loud environment, a visual output may be desired, while in a quieter environment, an audible output may be preferred.

Although the foregoing disclosure has been described in some detail by way of illustration and example, for purposes of clarity or understanding, it will be obvious that certain changes and modifications may be practiced within the scope of the appended claims.

What is claimed is:

1. A surgical system, comprising:
a surgical instrument; and
a battery assembly releasably engagable with the surgical instrument and configured to supply power to the surgical instrument, the battery assembly including an alarm configured to activate upon disengagement of the battery assembly from the surgical instrument and further configured to deactivate upon engagement of the battery assembly with the surgical instrument.

2. The surgical system according to claim 1, wherein, upon activation of the alarm, an output component produces at least one of a visual, audible, and tactile output.

3. The surgical system according to claim 1, wherein, upon activation of the alarm, a timing circuit is initiated, the timing circuit configured to signal an output component to produce at least one of a visual, audible, and tactile output upon passage of a predetermined length of time.

4. The surgical system according to claim 1, wherein the alarm further includes a sensing component configured to sense contact between the battery assembly and a magnetically conductive surface, the sensing component configured to signal an output component to produce at least one of a visual, audible, and tactile output upon contact between the battery assembly and a magnetically conductive surface.

5. The surgical system according to claim 4, wherein the alarm is configured such that, upon sensing contact between the battery assembly and a magnetically conductive surface, a timing circuit is initiated, the timing circuit configured to signal an output component to produce at least one of a visual, audible, and tactile output upon passage of a predetermined length of time.

6. The surgical system according to claim 1, wherein the alarm is configured to deactivate upon engagement of the battery assembly with a battery charger.

7. The surgical system according to claim 1, wherein the battery assembly further includes an activation member movable between a first position and a second position for activating and deactivating the alarm, respectively, and wherein, upon engagement of the battery assembly and the surgical instrument, the activation member is moved to the second position.

8. The surgical system according to claim 7, wherein, upon engagement of the battery assembly to a battery charger, the activation member is moved to the second position.

9. A surgical system, comprising:
a surgical instrument;
a battery charger; and
a battery assembly releasably engagable with the surgical instrument for supplying power to the surgical instrument and releasably engagable with the battery charger for charging the battery assembly, the battery assembly including an alarm configured to activate when the battery assembly is disengaged from both the surgical instrument and the battery charger, the alarm further configured to deactivate upon engagement of the battery assembly to one of the surgical instrument and the battery charger.

10. The surgical system according to claim 9, wherein, upon activation of the alarm, an output component produces at least one of a visual, audible, and tactile output.

11. The surgical system according to claim 9, wherein, upon activation of the alarm, a timing circuit is initiated, the timing circuit configured to signal an output component to produce at least one of a visual, audible, and tactile output upon passage of a predetermined length of time.

12. The surgical system according to claim 9, wherein the alarm further includes a sensing component configured to sense contact between the battery assembly and a magnetically conductive surface, the sensing component configured to signal an output component to produce at least one of a visual, audible, and tactile output upon contact between the battery assembly and a magnetically conductive surface.

13. The surgical system according to claim 12, wherein the alarm is configured such that, upon sensing contact between the battery assembly and a magnetically conductive surface, a timing circuit is initiated, the timing circuit configured to signal an output component to produce at least one of a visual, audible, and tactile output upon passage of a predetermined length of time.

14. The surgical system according to claim 9, wherein the battery assembly further includes an activation member movable between a first position and a second position for activating and deactivating the alarm, respectively, and wherein, upon engagement of the battery assembly to one of the surgical instrument and the battery charger, the activation member is moved to the second position.

15. A surgical system, comprising:
a surgical instrument; and
a battery assembly releasably engagable with the surgical instrument for supplying power to the surgical instrument, the battery assembly including an alarm configured to produce at least one of a visual, audible, and tactile output once the battery assembly has been disengaged from the surgical instrument for a predetermined length of time.

16. The surgical system according to claim 15, further comprising a battery charger, the battery assembly releasably engagable with the battery charger for charging the battery assembly, wherein the alarm is configured to produce at least one of a visual, audible, and tactile output once the battery assembly has been disengaged from both the surgical instrument and the battery charger for a predetermined length of time.

17. The surgical system according to claim 15, wherein the alarm includes a timing circuit and an output component, the timing circuit configured to signal the output component to produce the at least one of a visual, audible, and tactile output upon passage of the predetermined length of time.

18. The surgical system according to claim 15, wherein the battery assembly further includes an activation member movable between a first position and a second position for activating and deactivating the timing circuit, respectively, wherein, upon engagement of the battery assembly to the surgical instrument, the activation member is moved to the second position, and wherein, upon disengagement of the battery assembly from the surgical instrument, the activating member is moved to the first position.

* * * * *